US010977101B2

(12) United States Patent
Li et al.

(10) Patent No.: US 10,977,101 B2
(45) Date of Patent: Apr. 13, 2021

(54) INTEROPERABILITY BETWEEN PROGRAMS ASSOCIATED WITH DIFFERENT ADDRESSING MODES

(71) Applicant: INTERNATIONAL BUSINESS MACHINES CORPORATION, Armonk, NY (US)

(72) Inventors: Naijie Li, Beijing (CN); Bao Zhang, Beijing (CN); Jing Lu, Beijing (CN); Jin Hong Fu, Beijing (CN); Kershaw Mehta, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 16/217,971

(22) Filed: Dec. 12, 2018

(65) Prior Publication Data
US 2020/0192730 A1  Jun. 18, 2020

(51) Int. Cl.
*G06F 9/54* (2006.01)

(52) U.S. Cl.
CPC .................. *G06F 9/546* (2013.01)

(58) Field of Classification Search
None
See application file for complete search history.

(56) References Cited

U.S. PATENT DOCUMENTS

| 5,452,456 | A | 9/1995 | Mourey et al. |
| 5,724,585 | A | 3/1998 | Hassitt et al. |
| 5,764,947 | A | 6/1998 | Murphy et al. |
| 6,502,237 | B1 | 12/2002 | Yates et al. |
| 6,725,366 | B1 | 4/2004 | Swanberg |
| 7,171,543 | B1 | 1/2007 | Ronen et al. |
| 7,451,298 | B2 | 11/2008 | Peak et al. |
| 8,813,104 | B2 | 8/2014 | Saborowski |
| 9,569,234 | B2 | 2/2017 | De et al. |
| 9,652,210 | B2 | 5/2017 | Suchy et al. |
| 2005/0086650 | A1* | 4/2005 | Yates, Jr. et al. |
| 2006/0184919 | A1* | 8/2006 | Chen et al. |
| 2008/0034194 | A1* | 2/2008 | Peak et al. |
| 2009/0089764 | A1* | 4/2009 | Lai et al. |
| 2012/0233612 | A1 | 9/2012 | Beckett |
| 2012/0304160 | A1 | 11/2012 | Soeder |

(Continued)

OTHER PUBLICATIONS

List of IBM Patents or Patent Applications Treated as Related; (Appendix P), Filed May 29, 2020; 2 pages.

(Continued)

*Primary Examiner* — Shih-Wei Kraft
(74) *Attorney, Agent, or Firm* — Cantor Colburn LLP; Teddi Maranzano

(57) ABSTRACT

Systems, methods, and computer-readable media are described for interoperability between programs associated with different addressing modes. A caller program associated with a first addressing mode (e.g., a 32-bit program or a 64-bit program) that is executing within a parent runtime environment makes a call to an external interface to execute a target callee program that is associated with a second addressing mode different from the first addressing mode. The target callee program is then executed in a pre-initialized secondary runtime environment that executes on the same task or thread as the parent runtime environment.

15 Claims, 7 Drawing Sheets

(56) References Cited

U.S. PATENT DOCUMENTS

2014/0365754 A1* 12/2014 Combs et al.
2015/0277867 A1   10/2015 Hasabnis et al.
2016/0011869 A1*  1/2016 Jackson
2017/0039367 A1*  2/2017 Ionescu et al.
2017/0329621 A1  11/2017 Beckett

OTHER PUBLICATIONS

Tang et al., "Termination of Programs Associated With Different Addressing Modes", U.S. Appl. No. 16/885,716, filed May 28, 2020.

Jing Lu et al., "Parameter Management Between Programs," U.S. Appl. No. 16/380,232, filed Apr. 12, 2019.

List of IBM Patents or Patent Applications Treated as Related; (Appendix P), Filed Apr. 12, 2019; 2 pages.

Microsoft; "32-bit and 64-bit Interoperability;" https://msdn.microsoft.com/en-us/library/windows/desktop/ee872017(v=vs.85).aspx; retrieved Jun. 23, 2018; pp. 1-2.

* cited by examiner

INTEROPERABILITY BETWEEN PROGRAMS ASSOCIATED WITH DIFFERENT ADDRESSING MODES

BACKGROUND

The present invention relates generally to the interaction between programs associated with different addressing modes, and more particularly, to interoperability between programs associated with different addressing modes.

A 32-bit processor architecture design—a once common processor architecture—is becoming increasingly replaced by a 64-bit processor architecture. An n-bit processor (e.g., a central processing unit (CPU)) includes various registers, each of which is capable of referencing $2^n$ memory addresses that are, in turn, used to access corresponding data stored in random access memory (RAM). For instance, each register in a 32-bit processor is capable of referencing $2^{32}$ memory addresses, which corresponds to 4 gigabytes of RAM because each bit in the register can reference an individual byte in memory. In contrast, each register in a 64-bit processor is capable of theoretically referencing $2^{64}$ memory addresses corresponding to 16 exabytes of RAM—several orders of magnitude greater than a 32-bit register.

Generally speaking, a particular operating system (O/S) is configured to run on a particular n-bit processor. For instance, a 32-bit O/S is configured to run on a 32-bit processor while a 64-bit O/S is configured to run on a 64-bit processor. A lower bit O/S can run on a higher bit processor, but not the other way around. For example, a 32-bit O/S can run on a 64-bit processor, but a 64-bit O/S cannot run on a 32-bit processor. Similarly, computer programs, applications, or the like are typically written for a particular n-bit O/S (e.g., a 64-bit program for a 64-bit O/S). Further, while a lower bit program can be handled by a higher bit O/S (e.g., a 32-bit program running on a 64-bit O/S), the converse is generally not true. That is, a lower bit O/S generally cannot handle execution of a higher bit program. For instance, a 64-bit application cannot run on a 32-bit processor (or be handled by a 32-bit O/S) because the 64-bit instructions of the 64-bit application will not be recognized by a 32-bit processor.

Various conventional approaches exist for supporting interactions between programs associated with different addressing modes such as 32-bit and 64-bit programs. These approaches, however, suffer from a number of technical drawbacks. Technical solutions for supporting interoperability between programs associated with different addressing modes that address technical drawbacks associated with conventional approaches are described herein.

SUMMARY

In one or more example embodiments, a method for interoperability between programs associated with different addressing modes is disclosed. The method includes receiving, from a caller program executing in a parent runtime environment, a call to an external interface to execute a target callee program, where the caller program is associated with a first addressing mode and the target callee program is associated with a second addressing mode that is different from the first addressing mode. The method further includes identifying a pre-initialized secondary runtime environment for executing the target callee program and executing the target callee program within the pre-initialized secondary runtime environment.

In one or more other example embodiments, a system for interoperability between programs associated with different addressing modes is disclosed. The system includes at least one memory storing computer-executable instructions and at least one processor configured to access the at least one memory and execute the computer-executable instructions to perform a set of operations. The operations include receiving, from a caller program executing in a parent runtime environment, a call to an external interface to execute a target callee program, where the caller program is associated with a first addressing mode and the target callee program is associated with a second addressing mode that is different from the first addressing mode. The operations further include identifying a pre-initialized secondary runtime environment for executing the target callee program and executing the target callee program within the pre-initialized secondary runtime environment.

In one or more other example embodiments, a computer program product for interoperability between programs associated with different addressing modes is disclosed. The computer program product includes a non-transitory storage medium readable by a processing circuit, the storage medium storing instructions executable by the processing circuit to cause a method to be performed. The method includes receiving, from a caller program executing in a parent runtime environment, a call to an external interface to execute a target callee program, where the caller program is associated with a first addressing mode and the target callee program is associated with a second addressing mode that is different from the first addressing mode. The method further includes identifying a pre-initialized secondary runtime environment for executing the target callee program and executing the target callee program within the pre-initialized secondary runtime environment.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
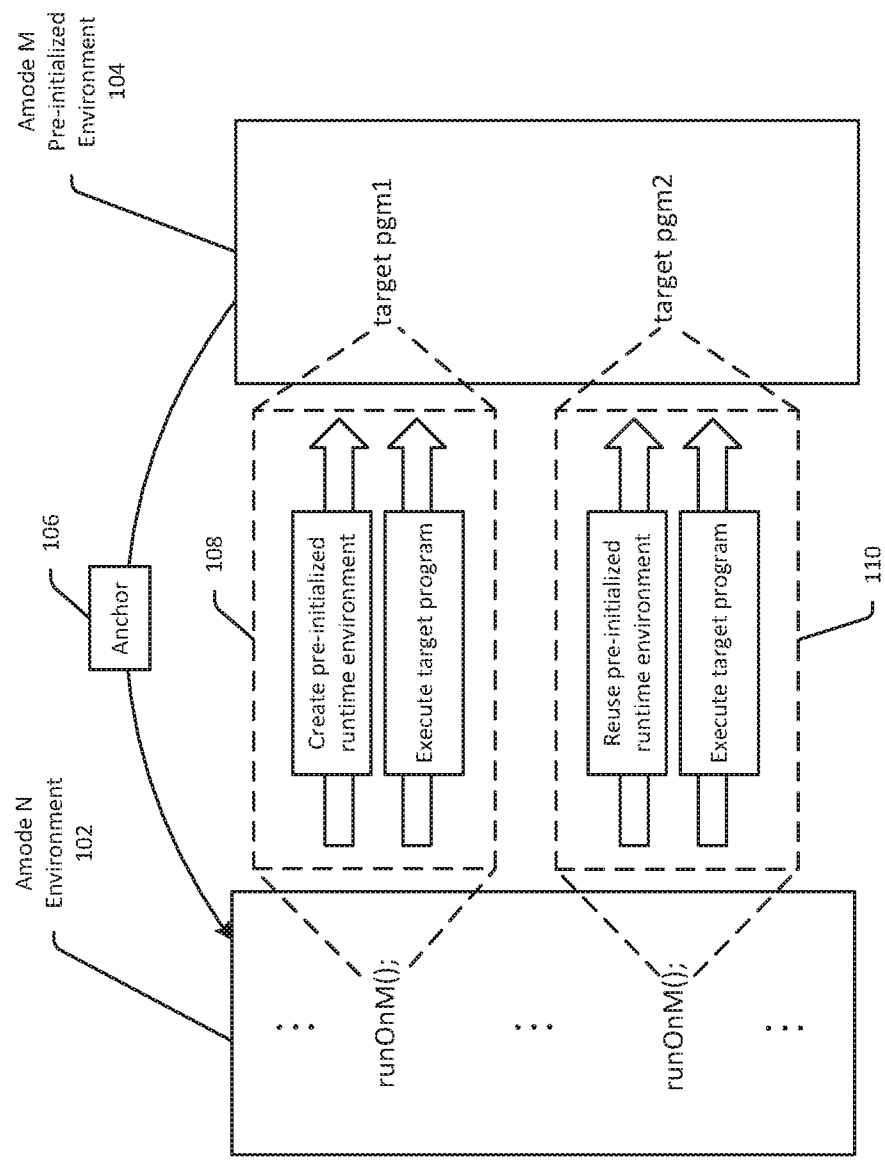
FIG. 1 is a schematic diagram illustrating execution of a target callee program in a pre-initialized secondary runtime environment in response to a call to an external interface from a caller program in a single-threaded parent runtime environment in accordance with one or more example embodiments.

Example embodiments of the invention relate to, among other things, systems, methods, computer-readable media, techniques, and methodologies for interoperability between programs associated with different addressing modes. The different addressing modes may be referred to herein generically as Amode M and Amode N, where M and N are different values. For instance, in example embodiments, a program associated with addressing mode Amode M may be a 31-bit or 32-bit program and a program associated with addressing mode Amode N may be a 64-bit program, or vice versa. While example embodiments may be described with respect to interoperability between 32-bit and 64-bit programs, it should be appreciated that the programs may be any N-bit and M-bit programs as long as N and M represent different values (i.e., different addressing modes). In addition, the term program as used herein encompasses any software application, program module, or more generally, computer-executable code configured to execute on a computer processor. Further, interoperability between programs associated with different addressing modes may include the capability to handle cross-Amode function calls (i.e., calls between a caller and a callee associated with different addressing modes) including, without limitation, dynamic linkage function calls (e.g., where the caller and the callee are in different executables); static linkage function calls (e.g., where the caller and the callee are in the same executable); dynamic calls; and so forth.

Recent years have seen the emergence of an increasing number of 64-bit programs, which provide better scalability and much larger memory addressability than 32-bit programs, for example. Further, more 64-bit programs are being written to leverage certain innovations only available with the 64-bit addressing mode. There remain, however, many 32-bit programs that continue to play a vital role in critical workloads. Thus, interaction between 32-bit programs and 64-bit programs is necessary to modernize the business logic of workloads, while at the same time, maintaining the viability of legacy 32-bit programs.

There are various differences between different addressing modes that make interoperability between programs written in the different addressing modes difficult including, without limitation, different memory addressability capabilities (e.g., 4 gigabyte for a 32-bit addressing mode and 16 exabytes for a 64-bit addressing mode) and different linkage conventions that define how stack frames are managed and how parameters are passed. With respect to linkage convention differences, in a 64-bit program, for example, save areas and registers are twice as large as in a 32-bit program such that calling conventions for a 64-bit program take advantage of the additional register space to pass more arguments in registers. Further, 32-bit programs utilize a standard linkage convention (upward stack) while 64-bit programs utilize a different linkage convention (downward stack).

There are various existing approaches for supporting 32-bit and 64-bit interactions, each of which suffers from various technical drawbacks. For example, inter-process communication has been used but the overhead that it introduces contributes to poor performance. Moreover, redesign of the original application is required including additional development and testing which requires significant effort and can result in significant delay. In addition, each programming language has its own inter-process communication semantics which can result in issues for calls between different languages. Another existing approach for supporting 32-bit and 64-bit interactions is a remote call based on, for example, a RESTful Application Programming Interface (API). However, the performance associated with remote calls is even worse than with inter-process communication. Yet another existing approach is to recompile an application. For example, a 32-bit application can be recompiled as a 64-bit application. This approach, however, is an all-or-none approach that requires recompilation of all programs in an application, which can be a disruptive migration particularly for large enterprises. In addition, some languages still have no 64-bit support (e.g., Enterprise COBOL).

Example embodiments of the invention provide an interoperability methodology for programs associated with different addressing modes that is based on creating and utilizing a pre-initialized secondary runtime environment to enable function calls across the different addressing modes. This interoperability technique in accordance with example embodiments of the invention represents a technical solution that addresses the aforementioned technical problems associated with existing approaches for supporting interaction across addressing modes. In particular, an interoperability technique in accordance with example embodiments of the invention does not require any changes to be made to programs written in their respective addressing modes and is language-independent meaning that interoperability is supported between any languages and any addressing modes. In addition, the pre-initialized secondary runtime environment that is generated and utilized in accordance with example embodiments is persistent, and thus, can support multiple interoperability calls, which in turn, improves performance. Still further, an interoperability technique in accordance with example embodiments can be used in connection with any existing compiler; a Java Native Interface (JNI); or any other system/runtime/software to support the interoperability of programs associated with different addressing modes. In addition, in accordance with example embodiments, the respective executions of different addressing mode programs are separated which allows for easier debugging. Each of these technical improvements associated with an interoperability technique in accordance with example embodiments constitutes technical effects of the invention that together represent an improvement in computer technology and the functioning of a computer. In particular, these technical improvements improve the functioning of a computer by allowing for improved cross-addressing mode interactions between programs associated with different addressing modes.

Illustrative methods in accordance with example embodiments of the invention will now be described. It should be noted that each operation of any of the methods 400-600 may be performed by one or more of the program modules or the like depicted in FIG. 7, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 4:
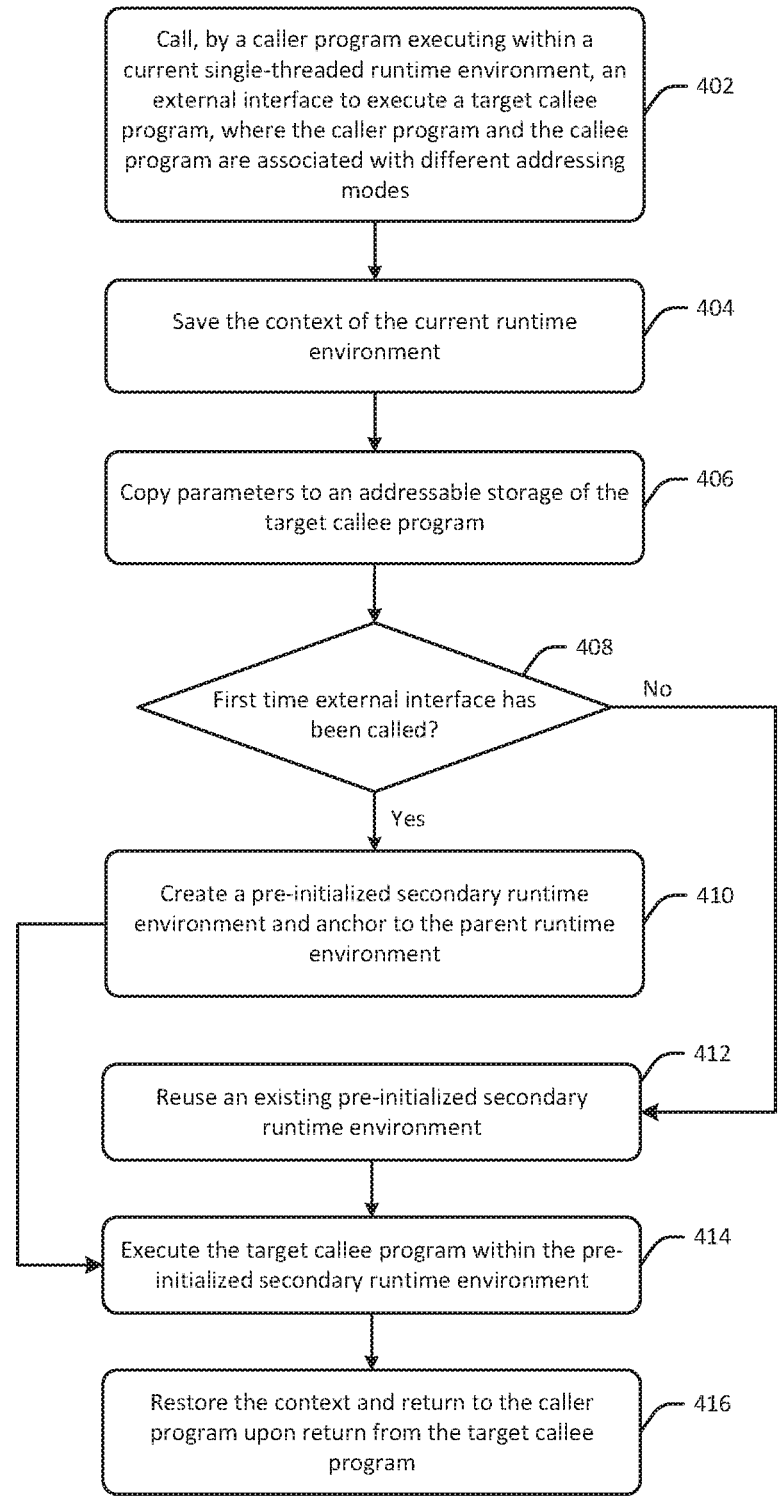
FIG. 4 is a process flow diagram of an illustrative method for executing a target callee program in a pre-initialized secondary runtime environment in response to a call to an external interface from a caller program in a single-threaded parent runtime environment in accordance with one or more example embodiments.

FIG. 1 is a schematic diagram illustrating an Amode N program invoking an Amode M program in a single-threaded parent runtime environment and FIG. 4 is a process flow diagram of an illustrative method 400 for implementing the use case of FIG. 1. FIGS. 1 and 4 will be described in conjunction with one another hereinafter.

Referring first to FIG. 1 in conjunction with FIG. 4, at block 402 of the method 400, in example embodiments, a caller program executing within a current parent single-threaded runtime environment (Amode N environment 102) makes a call to an external interface (runOnM( )) to execute a target callee program (pgm1 or pgm2 depending on the particular use case). In example embodiments, the caller program and the target callee program are associated with different addressing modes. For instance, the caller program may be 32-bit and the target callee program may be 64-bit, or vice versa. Thus, in example embodiments, the external interface runOnM( ) may represent a call to an Amode M program from an Amode N program. Similarly, an external interface runOnN( ) (described in more detail later in this disclosure in reference to FIG. 2) may represent a call to an Amode N program from an Amode M program. The caller program may be any computer-executable code including, without limitation, an application, a compiler, a runtime library; or the like. The caller program may call the external interface runOnM( ) by providing the target program name and any associated parameters.

At block 404 of the method 400, the external interface may save the current context of the current parent single-threaded runtime environment (the Amode N environment 102). In addition, at block 406 of the method 400, the external interface may copy parameters to an addressable storage of the target program. Then, at block 408 of the method 400, a determination may be made as to whether the call to the external interface is a first call to the external interface. In example embodiments, in response to a positive determination at block 408, a pre-initialized secondary runtime environment (Amode M environment 104) is created and anchored 106 to the parent runtime environment (Amode N environment 102). This determination path is represented by use case 108 depicted in FIG. 1. On the other hand, in response to a negative determination at block 408 indicating that a call to the external interface has previously been made, and thus, that the pre-initialized secondary runtime environment has already been created, the existing pre-initialized secondary runtime environment may be reused at block 412 of the method 400. This determination path is represented by use case 110 depicted in FIG. 1.

Once a pre-initialized secondary runtime environment (Amode M pre-initialized environment 104) is created or an existing one identified, the target callee program (pgm1 for use case 108 or pgm2 for use case 110) is executed at block 414 of the method 400. In example embodiments, the target callee program pgm2 is associated with the same addressing mode (Amode M) as the target callee program pgm1, and thus, the pre-initialized secondary runtime environment previously created for executing target callee program pgm1 in response to the call to the external interface can be reused in connection with the subsequent call to the external interface to execute the target callee program pgm2.

At block 416 of the method 400, the external interface restores the saved context and returns control to the caller program upon return of control from the target callee program that was executed. In example embodiments, the parent runtime environment (Amode N environment 102) and the pre-initialized secondary runtime environment (Amode M pre-initialized environment 104) reside on the same task or thread. Further, in example embodiments, the pre-initialized secondary runtime environment (Amode M pre-initialized environment 104) is terminated when the parent runtime environment (Amode N environment 102) terminates.

Figure 2:
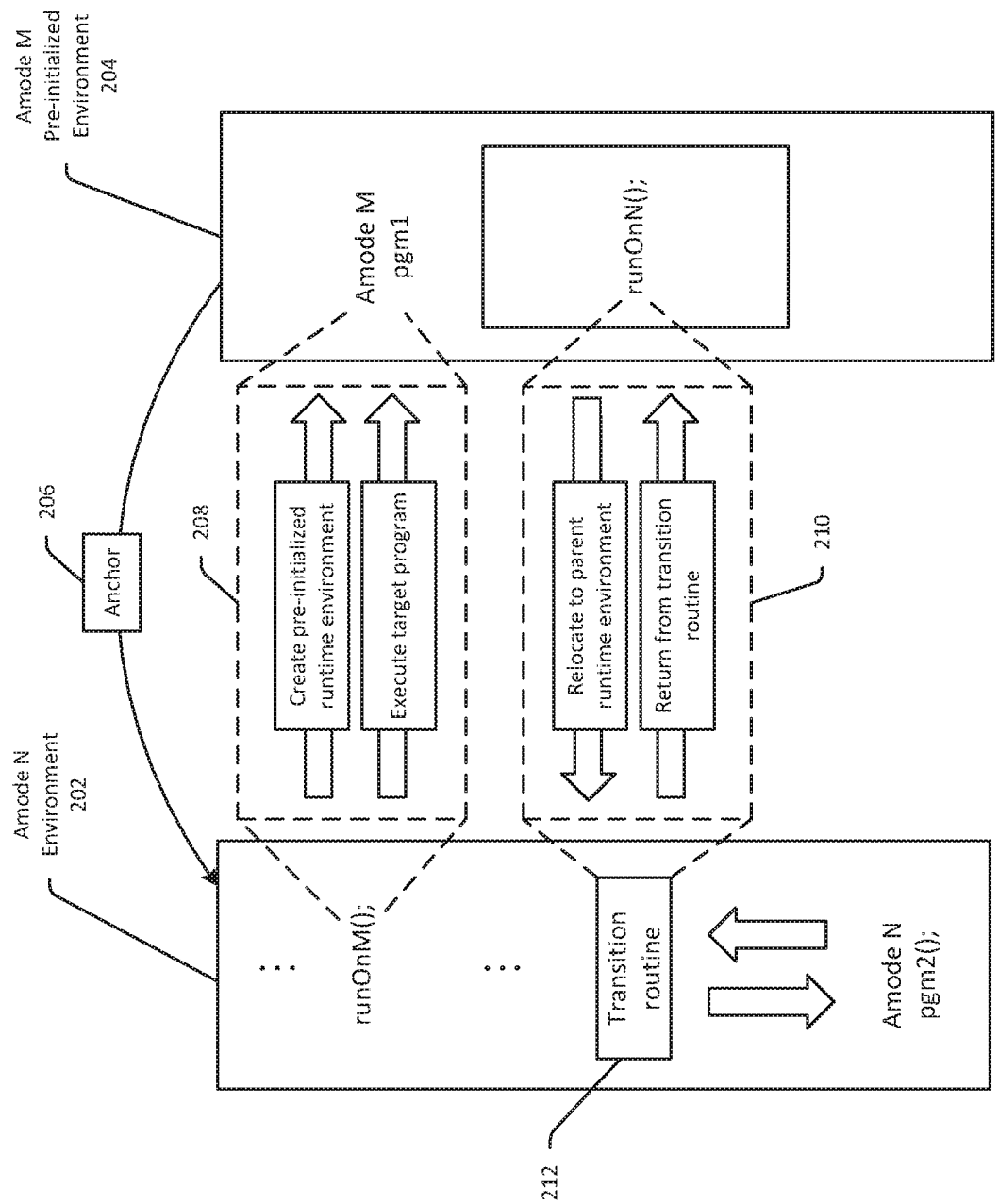
FIG. 2 is a schematic diagram illustrating execution, in a pre-initialized secondary runtime environment, of a target callee program having a nested crossing of addressing mode calls in response to a call to an external interface from a caller program in a single-threaded parent runtime environment in accordance with one or more example embodiments.
Figure 5:
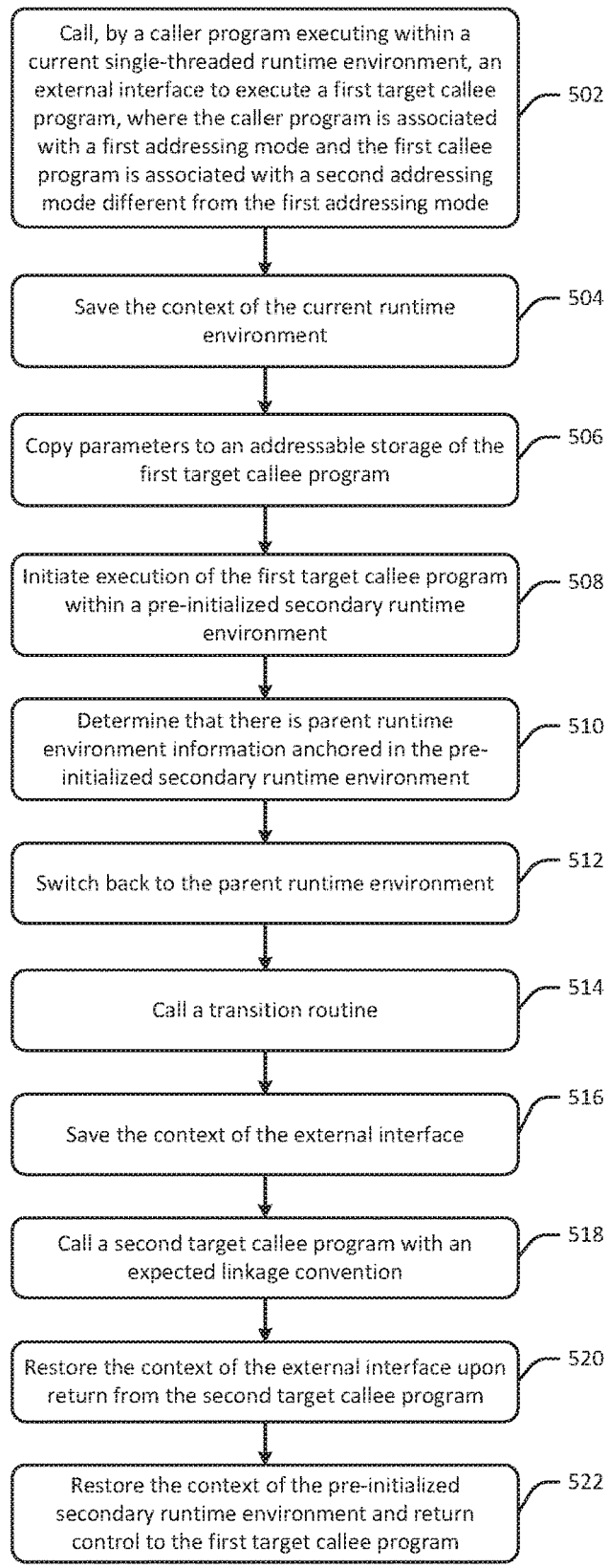
FIG. 5 is a process flow diagram of an illustrative method for executing, in a pre-initialized secondary runtime environment, a target callee program having a nested crossing of addressing mode calls in response to a call to an external interface from a caller program in a single-threaded parent runtime environment in accordance with one or more example embodiments.

FIG. 2 is a schematic diagram illustrating a use case involving nested calls between Amode N and Amode M programs and FIG. 5 is a process flow diagram of an illustrative method 500 for implementing the use case of FIG. 2. FIGS. 2 and 5 will be described in conjunction with one another hereinafter.

At block 502 of the method 500, in example embodiments, a caller program executing within a current parent single-threaded runtime environment (Amode N environment 202) makes a call to an external interface (runOnM( )) to execute a first target callee program (pgm1). In example embodiments, the caller program is associated with a first addressing mode that is different from a second addressing mode associated with the first target callee program.

At block 504 of the method 500, the external interface may save the current context of the current parent single-threaded runtime environment (the Amode N environment 202). In addition, at block 506 of the method 500, the external interface may copy parameters to an addressable storage of the first target callee program. Then, at block 508 of the method 500, execution of the first target callee program (pgm1) may be initiated within a pre-initialized secondary runtime environment (Amode M pre-initialized environment 204). It should be appreciated that, similar to method 400, the method 500 may include operations for determining whether the call to the external interface is a first call to the interface, and if so, operations for creating the Amode M pre-initialized secondary runtime environment 204 and anchoring 206 it to the parent runtime environment (Amode N environment 202). Alternatively, if the external interface was previously called, an existing pre-initialized secondary runtime environment may be used. These operations are not depicted in FIG. 5 for ease of explanation. The operations at blocks 502 and 504 may form part of a first stage 208 of the method 500. Remaining operations of the method 500 may form part of a second stage 210 of the method 500.

In example embodiments, parent runtime environment information may be anchored in the Amode M pre-initialized secondary runtime environment 204, which is represented in FIG. 2 as a call to external interface runOnN( ). Such parent runtime environment information may be identified at block 510 of the method 500 and may include, for example, a nested call to a second target callee program that is associated with the first addressing mode. If such a call to external interface runOnN( ) is identified during execution of the first target callee program (pgm1), then the runtime environment may switch back to the parent runtime environment (Amode N environment 202) at block 512 of the method 500.

At block 514 of the method 500, a transition routine 212 may be called. At block 516 of the method 500, in example embodiments, the transition routine 212 saves the context of the external interface runOnN( ). Then, at block 518 of the method 500, in example embodiments, the transition routine 212 calls a second target callee program (pgm2) using a linkage convention for the first addressing mode associated with the second target callee program. In example embodiments, the transition routine 212 is configured to handle parameter passing, stack manipulation, etc. for the first addressing mode.

In example embodiments, when control is returned from the second target callee program, the transition routine 212 restores the saved context of the external interface runOnN( ) at block 520 of the method 500. Then, in example embodiments, at block 522, the external interface runOnN( ) restores the context of the pre-initialized secondary runtime environment and returns control to the caller program, which in this case, is the first target callee program. In example embodiments, the parent runtime environment (Amode N environment 202) and the pre-initialized secondary runtime environment (Amode M pre-initialized environment 204) reside on the same task or thread. Further, in example embodiments, the pre-initialized secondary runtime environment (Amode M pre-initialized environment 204) is terminated when the parent runtime environment (Amode N environment 202) terminates.

Figure 3:
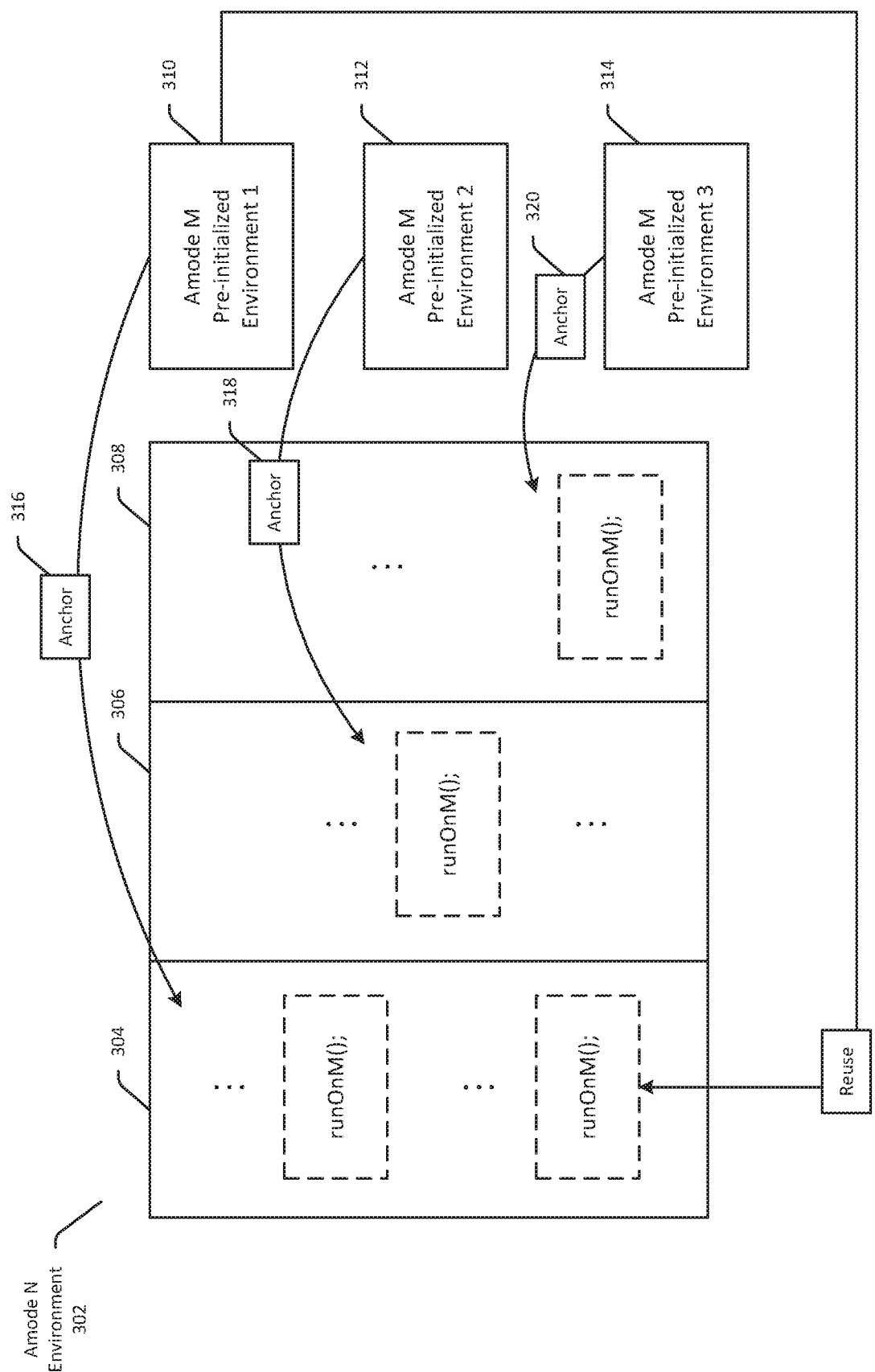
FIG. 3 is a schematic diagram illustrating execution of target callee programs in pre-initialized secondary runtime environments respectively corresponding to threads of a multi-threaded parent runtime environment in response calls to an external interface from caller programs executing within the multi-threaded parent runtime environment in accordance with one or more example embodiments.
Figure 6:
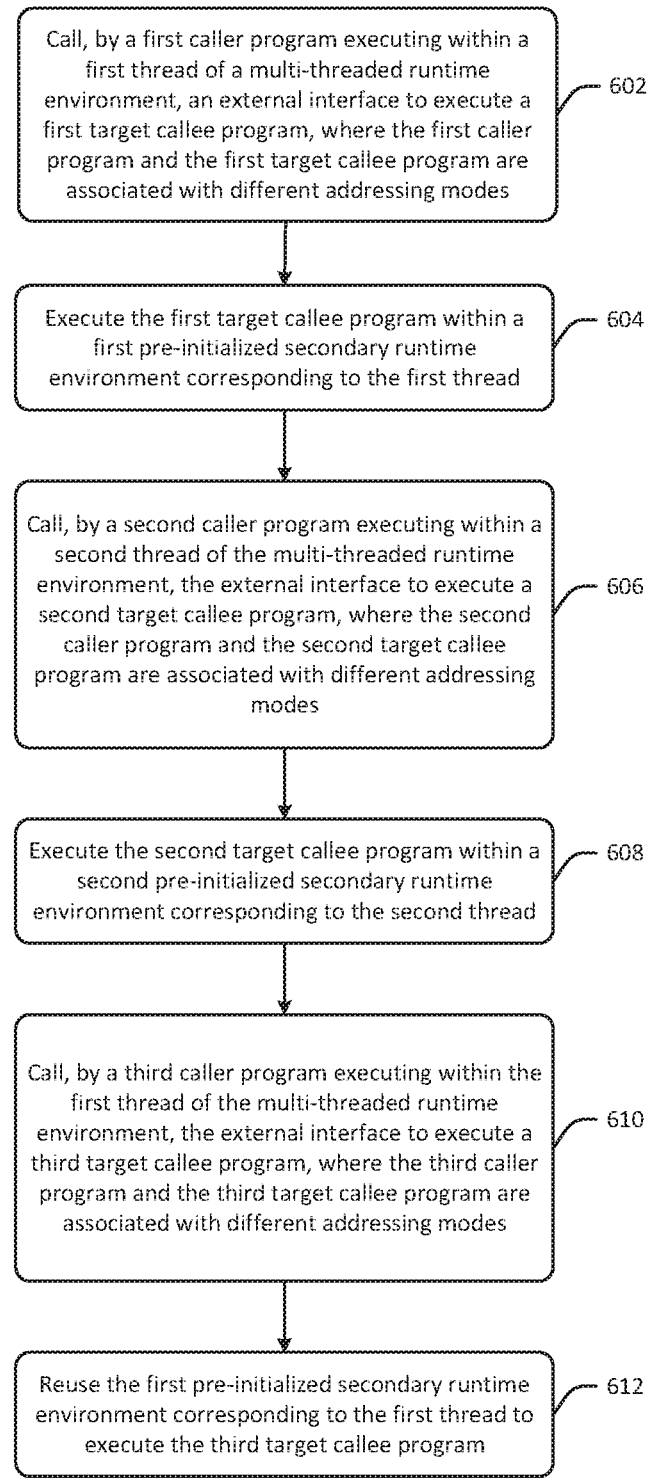
FIG. 6 is a process flow diagram of an illustrative method for executing target callee programs in pre-initialized secondary runtime environments respectively corresponding to threads of a multi-threaded parent runtime environment in response calls to an external interface from caller programs executing within the multi-threaded parent runtime environment in accordance with one or more example embodiments.

FIG. 3 is a schematic diagram illustrating interoperability between Amode N and Amode M programs in a multi-threaded runtime environment and FIG. 6 is a process flow diagram of an illustrative method 600 for implementing the use case of FIG. 3. FIGS. 3 and 6 will be described in conjunction with one another hereinafter.

At block 602 of the method 600, in example embodiments, a first caller program executing within a first thread 304 of a multi-threaded runtime environment (Amode N environment 302) makes a call to an external interface runOnM( ) to execute a first target callee program. In example embodiments, the first caller program is associated with a first addressing mode (N) that is different from a second addressing mode (M) associated with the first target callee program. At block 604 of the method 600, the first target callee program is executed within a first pre-initialized secondary runtime environment (Amode M pre-initialized environment 310) that corresponds to the first thread 304. In example embodiments, if this is the first call to the external interface runOnM( ) within thread 304, then the first pre-initialized secondary runtime environment is created and anchored 316 to the first thread 304.

At block 606 of the method 600, in example embodiments, a second caller program executing within a second thread 306 of the multi-threaded runtime environment (the Amode N environment 302) makes a call to the external interface runOnM( ) to execute a second target callee program. In example embodiments, the second target callee program is associated with the same addressing mode (M) as the first target callee program. At block 608 of the method 600, the second target callee program is executed within a second pre-initialized secondary runtime environment (Amode M pre-initialized environment 312) that corresponds to the second thread 306. In example embodiments, if this is the first call to the external interface runOnM( ) within thread 306, then the second pre-initialized secondary runtime environment is created and anchored 318 to the second thread 304.

At block 610 of the method 600, in example embodiments, a third caller program (which may be the same caller program as the first caller program or a different caller program) executing within the first thread 304 of the multi-threaded runtime environment (the Amode N environment 302) makes a call to the external interface runOnM( ) to execute a third target callee program. In example embodiments, the third target callee program is associated with the same addressing mode (M) as the first target callee program and the second target callee program. At block 612 of the method 600, the first pre-initialized secondary runtime environment (Amode M pre-initialized environment 310) corresponding to the first thread 304 is reused because a prior call to the external interface runOnM( ) has already been made in the first thread 304, and thus, the first pre-initialized secondary runtime environment (Amode M pre-initialized environment 310) is already available for use to execute the third target callee program.

In the above-described manner, new pre-initialized secondary runtime environments are created as nested runtime environments within the multi-threaded parent runtime environment such that a respective pre-initialized secondary runtime environment operates as a respective nested environment within each thread of the parent runtime environment. Although not depicted as part of the illustrative method 600, it should be understood that, in example embodiments, that calls to the external interface in other threads of the multi-threaded parent runtime environment (e.g., thread 308) result in execution of the target callee program in corresponding pre-initialized secondary runtime environments (e.g., Amode M pre-initialized environment 314). It should further be appreciated that when a pre-initialized secondary runtime environment is created in response to a first call to the external interface within a given thread, the secondary runtime environment is anchored to the parent runtime environment. For instance, a first call to the external interface runOnM( ) in the third thread 308 results, in example embodiments, in creation of the pre-initialized secondary runtime environment 314 and anchoring 320 of the environment to the third thread 308. It should also be appreciated while three threads are illustratively depicted in FIG. 3, the multi-threaded Amode N runtime environment 302 may include any number of threads.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 7:
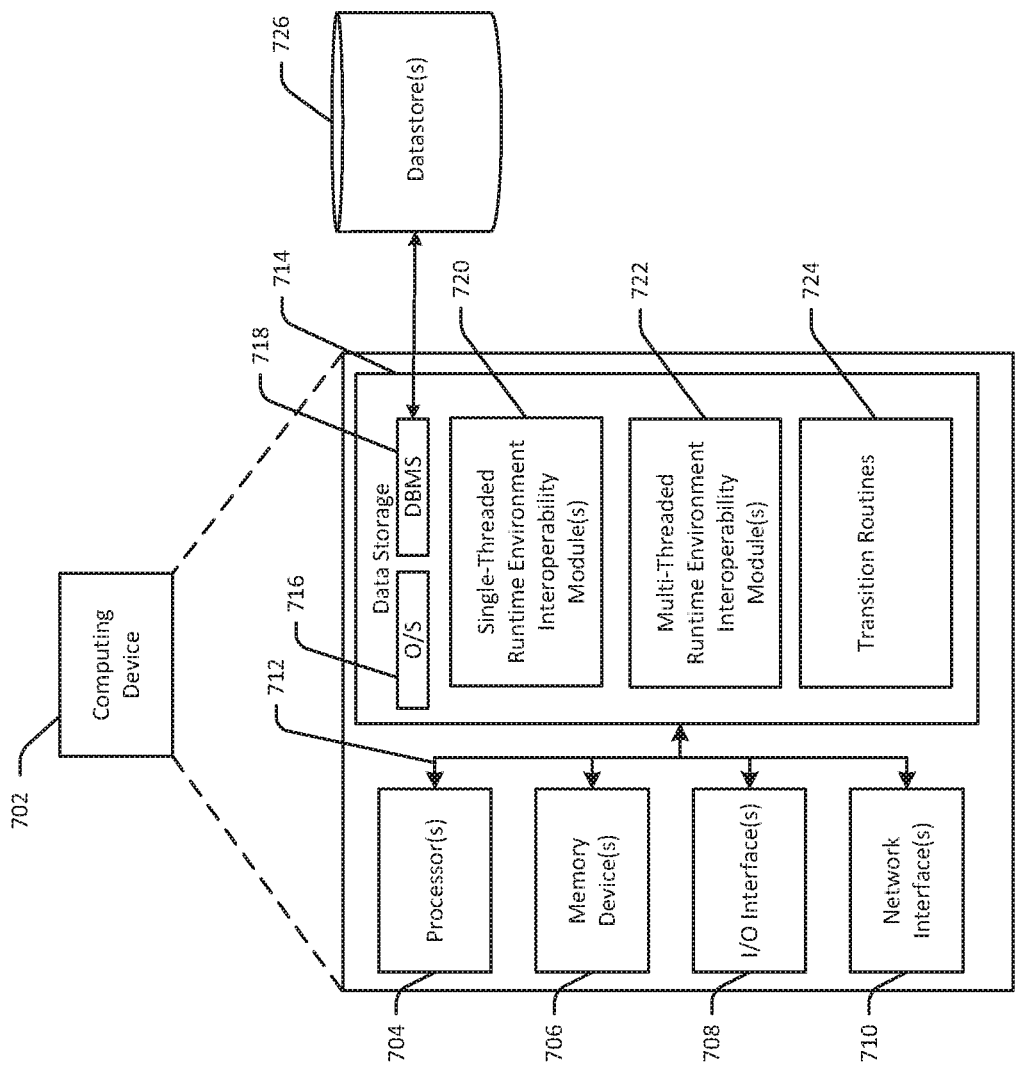
FIG. 7 is a schematic diagram of an illustrative computing device configured to implement one or more example embodiments.

FIG. 7 is a schematic diagram of an illustrative computing device 702 configured to implement one or more example embodiments of the disclosure. The computing device 702 may be any suitable device including, without limitation, a server, a personal computer (PC), a tablet, a smartphone, a wearable device, a voice-enabled device, or the like. While any particular component of the computing device 702 may be described herein in the singular, it should be appreciated that multiple instances of any such component may be provided, and functionality described in connection with a particular component may be distributed across multiple ones of such a component.

Although not depicted in FIG. 7, the computing device 702 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 may include one or more processors (processor(s)) 704; one or more memory devices 706 (generically referred to herein as memory 706); one or more input/output ("I/O") interface(s) 708; one or more network interfaces 710; and data storage 714. The computing device 702 may further include one or more buses 712 that functionally couple various components of the computing device 702.

The bus(es) 712 may include at least one of a system bus, a memory bus, an address bus, or a message bus, and may permit the exchange of information (e.g., data (including computer-executable code), signaling, etc.) between various components of the computing device 702. The bus(es) 712 may include, without limitation, a memory bus or a memory controller, a peripheral bus, an accelerated graphics port, and so forth. The bus(es) 712 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 706 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 706 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 706 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 714 may include removable storage and/or non-removable storage including, but not limited to, magnetic storage, optical disk storage, and/or tape storage. The data storage 714 may provide non-volatile storage of computer-executable instructions and other data. The memory 706 and the data storage 714, removable and/or non-removable, are examples of computer-readable storage media (CRSM) as that term is used herein.

The data storage 714 may store computer-executable code, instructions, or the like that may be loadable into the memory 706 and executable by the processor(s) 704 to cause the processor(s) 704 to perform or initiate various operations. The data storage 714 may additionally store data that may be copied to memory 706 for use by the processor(s) 704 during the execution of the computer-executable instructions. Moreover, output data generated as a result of execution of the computer-executable instructions by the processor(s) 704 may be stored initially in memory 706 and may ultimately be copied to data storage 714 for non-volatile storage.

More specifically, the data storage 714 may store one or more operating systems (O/S) 716; one or more database management systems (DBMS) 718 configured to access the memory 706 and/or one or more external datastores 726; and one or more program modules, applications, engines, managers, computer-executable code, scripts, or the like such as, for example, one or more single-threaded runtime environment interoperability modules 720; one or more multi-threaded runtime environment interoperability modules 722; and transition routines 724. Any of the components depicted as being stored in data storage 714 may include any combination of software, firmware, and/or hardware. The software and/or firmware may include computer-executable instructions (e.g., computer-executable program code) that may be loaded into the memory 706 for execution by one or more of the processor(s) 704 to perform corresponding operations described earlier. In particular, the single-threaded runtime environment interoperability module(s) 720 may be executed to perform operations of method 400 and/or method 500. The multi-threaded runtime environment interoperability module(s) 722 may be executed to perform operations of method 600. Further, the transition routines 724 may include the transition routine 212 previously described.

Although not depicted in FIG. 7, the data storage 714 may further store various types of data utilized by components of the computing device 702 (e.g., data stored in the datastore(s) 726). Any data stored in the data storage 714 may be loaded into the memory 706 for use by the processor(s) 704 in executing computer-executable instructions. In addition, any data stored in the data storage 714 may potentially be stored in the external datastore(s) 726 and may be accessed via the DBMS 718 and loaded in the memory 706 for use by the processor(s) 704 in executing computer-executable instructions.

The processor(s) 704 may be configured to access the memory 706 and execute computer-executable instructions loaded therein. For example, the processor(s) 704 may be configured to execute computer-executable instructions of the various program modules, applications, engines, managers, or the like of the computing device 702 to cause or facilitate various operations to be performed in accordance with one or more example embodiments of the disclosure. The processor(s) 704 may include any suitable processing unit capable of accepting data as input, processing the input data in accordance with stored computer-executable instructions, and generating output data. The processor(s) 704 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 704 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 704 may be capable of supporting any of a variety of instruction sets.

Referring now to other illustrative components depicted as being stored in the data storage 714, the O/S 716 may be loaded from the data storage 714 into the memory 706 and may provide an interface between other application software executing on the computing device 702 and hardware resources of the computing device 702. More specifically, the O/S 716 may include a set of computer-executable instructions for managing hardware resources of the computing device 702 and for providing common services to other application programs. In certain example embodiments, the O/S 716 may include or otherwise control the execution of one or more of the program modules, engines, managers, or the like depicted as being stored in the data storage 714. The O/S 716 may include any operating system now known or which may be developed in the future including, but not limited to, any server operating system, any mainframe operating system, or any other proprietary or non-proprietary operating system.

The DBMS 718 may be loaded into the memory 706 and may support functionality for accessing, retrieving, storing, and/or manipulating data stored in the memory 706, data stored in the data storage 714, and/or data stored in external datastore(s) 726. The DBMS 718 may use any of a variety of database models (e.g., relational model, object model, etc.) and may support any of a variety of query languages. The DBMS 718 may access data represented in one or more data schemas and stored in any suitable data repository. Data stored in the datastore(s) 726 may include, for example, function call parameters; linkage conventions; stack parameters; etc. External datastore(s) 726 that may be accessible by the computing device 702 via the DBMS 718 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 708 may facilitate the receipt of input information by the computing device 702 from one or more I/O devices as well as the output of information from the computing device 702 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 702 or may be separate. The I/O devices may further include, for example, any number of peripheral devices such as data storage devices, printing devices, and so forth.

The I/O interface(s) 708 may also include an interface for an external peripheral device connection such as universal serial bus (USB), FireWire, Thunderbolt, Ethernet port or other connection protocol that may connect to one or more networks. The I/O interface(s) 708 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 may further include one or more network interfaces 710 via which the computing device 702 may communicate with any of a variety of other systems, platforms, networks, devices, and so forth. The network interface(s) 710 may enable communication, for example, with one or more other devices via one or more of networks.

It should be appreciated that the program modules/engines depicted in FIG. 7 as being stored in the data storage 714 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 702 and/or other computing devices accessible via one or more networks, may be provided to support functionality provided by the modules depicted in FIG. 7 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 7 may be implemented, at least partially, in hardware and/or firmware across any number of devices.

It should further be appreciated that the computing device 702 may include alternate and/or additional hardware, software, or firmware components beyond those described or depicted without departing from the scope of the disclosure. More particularly, it should be appreciated that software, firmware, or hardware components depicted as forming part of the computing device 702 are merely illustrative and that some components may not be present or additional components may be provided in various embodiments. While various illustrative modules have been depicted and described as software modules stored in data storage 714, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 400-600 may be performed by a computing device 702 having the illustrative configuration depicted in FIG. 7, or more specifically, by one or more program modules, engines, applications, or the like executable on such a device. It should be appreciated, however, that such operations may be implemented in connection with numerous other device configurations.

The operations described and depicted in the illustrative methods of FIG. 4-6 may be carried out or performed in any suitable order as desired in various exemplary embodiments of the disclosure. Additionally, in certain example embodiments, at least a portion of the operations may be carried out in parallel. Furthermore, in certain example embodiments, less, more, or different operations than those depicted in FIGS. 4-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for interoperability between programs associated with different addressing modes, the method comprising:
   receiving, from a caller program executing in a parent runtime environment, a call to an external interface to execute a target callee program, wherein the caller program is associated with a first addressing mode and the target callee program is associated with a second addressing mode that is different from the first addressing mode;
   identifying a pre-initialized secondary runtime environment for executing the target callee program; and
   executing the target callee program within the pre-initialized secondary runtime environment,
   wherein during execution of the target callee program in the pre-initialized secondary runtime environment, determining that parent runtime environment information is anchored in the pre-initialized secondary runtime environment, wherein the parent runtime environment information comprises a nested call to a second external interface to execute a second target callee program associated with the first addressing mode,
   wherein the parent runtime environment is a multi-threaded runtime environment, and wherein the pre-initialized secondary runtime environment corresponds to a respective thread of the multi-threaded runtime environment, and
   wherein the first addressing mode is a lower bit addressing mode than the second addressing mode or the first addressing mode is a higher bit addressing mode than the second addressing mode.

2. The computer-implemented method of claim 1, further comprising:
   determining that the call to the external interface is a first call to the external interface; and
   generating the pre-initialized secondary runtime environment.

3. The computer-implemented method of claim 1, further comprising: determining that the external interface has previously been called; and reusing the pre-initialized secondary runtime environment generated during a prior call to the external interface.

4. The computer-implemented method of claim 1, further comprising: prior to execution of the target callee program, saving, by the external interface, a context of the parent runtime environment; prior to execution of the target callee program, copying, by the external interface, parameters to an addressable storage of the target callee program; determining that control has been returned to the external interface after execution of the target callee program; restoring, by the external interface, the saved context of the parent runtime environment; and returning, by the external interface, control to the caller program executing in the parent runtime environment.

5. The computer-implemented method of claim 1, wherein the external interface is a first external interface, the method further comprising:
   switching from the pre-initialized secondary runtime environment to the parent runtime environment;
   calling a transition routine;
   saving, by the transition routine, a context of the second external interface;
   calling, by the transition routine, the second target callee program using a linkage convention;
   executing the second target callee program;

restoring the saved context of the second external interface upon return of control from the second target callee program;
restoring a context of the pre-initialized secondary runtime environment; and
returning control to the first target callee program.

6. A system for interoperability between programs associated with different addressing modes, the system comprising:
at least one memory storing computer-executable instructions; and
at least one processor configured to access the at least one memory and execute the computer-executable instructions to:
receive, from a caller program executing in a parent runtime environment, a call to an external interface to execute a target callee program, wherein the caller program is associated with a first addressing mode and the target callee program is associated with a second addressing mode that is different from the first addressing mode;
identify a pre-initialized secondary runtime environment for executing the target callee program; and
execute the target callee program within the pre-initialized secondary runtime environment,
wherein during execution of the target callee program in the pre-initialized secondary runtime environment, determining that parent runtime environment information is anchored in the pre-initialized secondary runtime environment, wherein the parent runtime environment information comprises a nested call to a second external interface to execute a second target callee program associated with the first addressing mode,
wherein the parent runtime environment is a multi-threaded runtime environment, and wherein the pre-initialized secondary runtime environment corresponds to a respective thread of the multi-threaded runtime environment, and
wherein the first addressing mode is a lower bit addressing mode than the second addressing mode or the first addressing mode is a higher bit addressing mode than the second addressing mode.

7. The system of claim 6, wherein the at least one processor is further configured to execute the computer-executable instructions to:
determine that the call to the external interface is a first call to the external interface; and
generate the pre-initialized secondary runtime environment.

8. The system of claim 6, wherein the at least one processor is further configured to execute the computer-executable instructions to:
determine that the external interface has previously been called; and
reuse the pre-initialized secondary runtime environment generated during a prior call to the external interface.

9. The system of claim 6, wherein the at least one processor is further configured to execute the computer-executable instructions to:
prior to execution of the target callee program, save, by the external interface, a context of the parent runtime environment;
prior to execution of the target callee program, copy, by the external interface, parameters to an addressable storage of the target callee program;
determine that control has been returned to the external interface after execution of the target callee program;
restore, by the external interface, the saved context of the parent runtime environment; and
return, by the external interface, control to the caller program executing in the parent runtime environment.

10. The system of claim 6, wherein the at least one processor is further configured to execute the computer-executable instructions to:
switch from the pre-initialized secondary runtime environment to the parent runtime environment; call a transition routine;
save, by the transition routine, a context of the second external interface;
call, by the transition routine, the second target callee program using a linkage convention;
execute the second target callee program;
restore the saved context of the second external interface upon return of control from the second target callee program;
restore a context of the pre-initialized secondary runtime environment; and
return control to the first target callee program.

11. A computer program product for interoperability between programs associated with different addressing modes, the computer program product comprising a non-transitory storage medium readable by a processing circuit, the non-transitory storage medium storing instructions executable by the processing circuit to cause a method to be performed, the method comprising:
receiving, from a caller program executing in a parent runtime environment, a call to an external interface to execute a target callee program, wherein the caller program is associated with a first addressing mode and the target callee program is associated with a second addressing mode that is different from the first addressing mode;
identifying a pre-initialized secondary runtime environment for executing the target callee program; and
executing the target callee program within the pre-initialized secondary runtime environment,
wherein during execution of the target callee program in the pre-initialized secondary runtime environment, determining that parent runtime environment information is anchored in the pre-initialized secondary runtime environment, wherein the parent runtime environment information comprises a nested call to a second external interface to execute a second target callee program associated with the first addressing mode,
wherein the parent runtime environment is a multi-threaded runtime environment, and wherein the pre-initialized secondary runtime environment corresponds to a respective thread of the multi-threaded runtime environment, and
wherein the first addressing mode is a lower bit addressing mode than the second addressing mode or the first addressing mode is a higher bit addressing mode than the second addressing mode.

12. The computer program product of claim 11, the method further comprising:
determining that the call to the external interface is a first call to the external interface; and
generating the pre-initialized secondary runtime environment.

13. The computer program product of claim 11, the method further comprising:

determining that the external interface has previously been called; and reusing the pre-initialized secondary runtime environment generated during a prior call to the external interface.

14. The computer program product of claim 11, the method further comprising:

prior to execution of the target callee program, saving, by the external interface, a context of the parent runtime environment;

prior to execution of the target callee program, copying, by the external interface, parameters to an addressable storage of the target callee program;

determining that control has been returned to the external interface after execution of the target callee program;

restoring, by the external interface, the saved context of the parent runtime environment; and returning, by the external interface, control to the caller program executing in the parent runtime environment.

15. The computer program product of claim 11, wherein the external interface is a first external interface, the method further comprising:

switching from the pre-initialized secondary runtime environment to the parent runtime environment; calling a transition routine;

saving, by the transition routine, a context of the second external interface;

calling, by the transition routine, the second target callee program using a linkage convention;

executing the second target callee program;

restoring the saved context of the second external interface upon return of control from the second target callee program;

restoring a context of the pre-initialized secondary runtime environment; and returning control to the first target callee program.

* * * * *